United States Patent [19]
DesJardins

[11] Patent Number: 5,448,302
[45] Date of Patent: Sep. 5, 1995

[54] AUTO-TRANSLATING RECURSIVE EFFECTS APPARATUS AND METHOD

[75] Inventor: Philip DesJardins, Navada City, Calif.

[73] Assignee: The Grass Valley Group, Inc., Nevada City, Calif.

[21] Appl. No.: 337,909

[22] Filed: Nov. 14, 1994

Related U.S. Application Data

[63] Continuation of Ser. No. 867,244, Apr. 10, 1992, abandoned.

[51] Int. Cl.6 .......................................... H03N 5/272
[52] U.S. Cl. ............................... 348/578; 348/595; 348/718
[58] Field of Search ............... 348/578, 585, 586, 593, 348/595, 597, 598, 718, 716, 714, 722; 345/121, 157; H04N 5/272, 5/262

[56] References Cited

U.S. PATENT DOCUMENTS

| | | | |
|---|---|---|---|
| 4,148,070 | 4/1979 | Taylor | 348/719 |
| 4,214,263 | 7/1980 | Kaiser | 358/22 |
| 4,641,255 | 2/1987 | Hohmann | 358/104 |
| 4,689,681 | 8/1987 | Jackson | 358/22 X |
| 4,916,540 | 4/1990 | Kosaka | 358/160 |
| 4,974,083 | 11/1990 | Bloomfield et al. | 358/22 X |
| 5,010,409 | 4/1991 | Trytko | 358/22 X |
| 5,125,047 | 6/1992 | Kimura | 358/22 X |
| 5,146,212 | 9/1992 | Venolia | 345/157 |
| 5,165,070 | 11/1992 | Koyama | 358/160 |
| 5,214,414 | 5/1993 | Levine et al. | 345/157 |

*Primary Examiner*—Victor R. Kostak
*Attorney, Agent, or Firm*—Francis I. Gray; John Smith-Hill

[57] ABSTRACT

Apparatus for processing a video signal representing distribution of optically-perceptible information over a video raster includes a video combiner for receiving an input video signal and a delayed video signal and combining the input video signal and the delayed video signal to provide an output video signal. A memory receives and temporarily stores the output video signal and provides the delayed video signal, and read/write circuits access the memory so that pixels of the output video signal are spatially translated relative to the video raster when the output video signal is written into and read from the memory.

19 Claims, 5 Drawing Sheets

AUTO-TRANSLATING RECURSIVE EFFECTS APPARATUS AND METHOD

This is a continuation of application Ser. No. 07/867,244 filed Apr. 10, 1992 and now abandoned.

BACKGROUND OF THE INVENTION

This invention relates to video special effects, and more particularly to recursive video effects that provide a "trail" or "persistence" to a video image.

Recursive effects are commonly used in the video effects industry to leave a decaying after-image of an object as it moves within a field of video. Such an effect simulates a high persistence monitor, where the persistence is not provided by a high persistence phosphor but rather by a digital video effect.

It is conventional to process video signals in digital form in order to carry out special effects, particularly effects that involve delay or spatial transforms because of the ready availability of random access memories and other electronic components that operate on digital signals. Typically, the video signal is written into a frame memory and is subsequently read out, and the effect is accomplished by controlling the relationship between the read and write addresses.

Each pixel of a frame of a digital video signal has a unique logical address within the video raster. This logical address can be defined by the number of the line on which the pixel lies and the number of pixels between the beginning of the line and the pixel in question.

When a video signal is written into a frame memory, the pixel values are loaded into respective memory locations of the memory. The memory locations are defined by physical addresses that are not necessarily the same as the logical addresses within the raster. For instance, an image is considered to be two dimensional whereas a memory is a 1-dimensional array of memory locations that can be considered two dimensional by logical grouping. Such a grouping could map adjacent pixels of an image to widely separate memory locations with no effect on the observed visual output as long as the grouping method for reading tracks the method for writing.

FIG. 1 shows a prior art recursive effect circuit suitable for producing a decaying after-image or trail. The circuit shown in FIG. 1 receives a full-field background video signal and key control signal at terminal 2 and a shaped foreground video signal and the associated key control signal at terminal 4. The video signals are in digital form, such as NTSC D1, and the key control signals also are in digital form. Typically, the foreground video and key information represent a foreground object that does not occupy the entire video raster. The terminal 2 is connected to one input of a priority combiner 6 of the kind shown in U.S. Pat. No. 4,851,912, the disclosure of which is hereby incorporated by reference herein. The combiner 6 combines the background key and video data with a processed version of the foreground key and video data in accordance with the value of a priority signal $P_1$, as described in U.S. Pat. No. 4,851,912. The terminal 4 is connected to the foreground input of a second priority combiner 12, which receives key and video data derived from a second source in a manner that will be described below. The combiner 12 combines the foreground key and video data with the key and video data provided by the second source in accordance with a priority signal $P_2$.

The output of combiner 12 constitutes the output of the recursive effect circuit and is the above-mentioned processed version of the foreground key and video data.

The output of combiner 12 is also loaded into a recursive memory 14, and the contents of recursive memory 14 are subsequently read out, providing a time-delayed version of the output of combiner 12. The recursive memory 14 is typically a frame memory, and consequently the delay imposed by the memory 14 is equal to one frame interval. A multiplier 16, which constitutes the second source of digital key and video data, multiplies the delayed key and video data from recursive memory 14 by a decay factor $C_d$. Thus, the video signal applied to the second input of combiner 12 is an attenuated and delayed replica of the output of combiner 12. Consequently, the combiner mixes the frame that is currently being received at the terminal 4 with an attenuated replica of the previous frame that was output by the combiner 12. When an object represented by the foreground video signal moves relative to the video raster, the key and video data provided by the combiner 12 represent the foreground object of the current frame and a decaying after-image that forms a trail showing the path followed by the object to its current position. The output signal provided by the combiner 6 therefore represents the foreground object and its trail against the background represented by the background video data.

The decay factor $C_d$ determines the rate at which the after-image fades away. It can assume values between 0 and 1, with values near zero producing an almost instantaneous fade and values near one producing very long term persistence.

While there are several incidental variations on the basic approach described above, such as circuits that use a field store instead of a frame store, these variations are unimportant to the practice of the invention to be described below. For reference and background, however, the reader's attention is directed to U.S. Pat. No. 4,752,826 to Barnett, for "Intra-Field Recursive Interpolator", hereby incorporated by reference.

An apparatus for producing a recursive blur effect is described in U.S. Pat. No. 4,951,144 to the present inventor for "Recursive Video Blur Effect", hereby incorporated by reference. This recursive blur effect mixes neighboring decayed pixels in a way that produces an "airbrushed" trails effect. When recursive blurring is used for "flying" text characters, the trails left behind are smooth and the edges of the characters from previous frames are softened, and this creates a pleasing effect relative to the comparative harshness of the unblurred trails.

Another recursive apparatus is described in U.S. Pat. No. 5,153,711 issued Oct. 6, 1992 to the present inventor for "Recursive Video Hue Rotations to Obtain a Rainbow-Like Decaying After-Image", hereby incorporated by reference. In this apparatus a chrominance phase rotator is included within a recursive video effects loop, so that the hue of the after-image is altered as it decays. The chrominance phase rotator can be placed anywhere within the recursive loop, and can also be combined with a blurring effect and/or the decay factor multiplication needed for the basic recursive circuit.

The preceding discussion does not take account of latency, i.e. the number of clock delays from the output of the recursive memory back to the input of the recursive memory. These delays arise, for instance, from the decay multiplication in the multiplier 16 and the processing in the combiner 12. Therefore, if the pixel value from the physical address K is read from memory on read/write cycle q, the processed version of that pixel value does not become available at the input of the recursive memory until clock cycle q+L, where L is the latency, when the physical address K+L is accessed for reading. Therefore, in order to ensure that the processed pixel value will be written back to the same location, and preserve the relationship between logical addresses and physical addresses, the write address is offset by the latency L from the read address so that when the physical address K is accessed for reading, on read/write cycle q, the physical address that is accessed for writing is K−L.

The latency offset L may be considered as defining a vector having a horizontal component $L_h$ representing a number of pixels along a line of the video raster and a vertical component $L_v$ representing a number of lines of the raster. The offset due to latency is usually quite small ($L_v$ is zero and $L_h$ might be about plus 10), but $L_v$ may be positive if the recursive loop includes blurring. Neither $L_v$ nor $L_h$ can be negative.

SUMMARY OF THE INVENTION

In accordance with a first aspect of the present invention there is provided apparatus for processing a video signal representing distribution of optically-perceptible information over a video raster, said apparatus comprising combining means for receiving an input video signal and a delayed video signal and combining the input video signal and the delayed video signal to provide an output video signal, memory means for receiving and temporarily storing the output video signal and providing the delayed video signal, and read/write control means for accessing the memory means so that pixels of the output video signal are spatially translated relative to the video raster when the output video signal is written into and read from the memory means.

In accordance with a second aspect of the present invention there is provided a method of processing a video signal representing distribution of optically-perceptible information over a video raster, said method comprising combining an input video signal and a delayed video signal to provide an output video signal, and receiving and temporarily storing the output video signal and providing the delayed video signal, whereby pixels of the output video signal are spatially translated relative to the video raster.

In accordance with a third aspect of the present invention there is provided apparatus for processing a video signal representing distribution of optically-perceptible information over a video raster, said apparatus comprising combiner means for receiving an input video signal and a delayed video signal and combining the input video signal and the delayed video signal to provide an output video signal, memory means, and read/write control means for writing the output video signal into the memory means and subsequently reading the contents of the memory means to provide the delayed video signal in a manner such that pixels of the delayed video signal are spatially translated relative to corresponding pixels of the output video signal.

In accordance with a fourth aspect of the present invention there is provided apparatus for processing a video signal representing distribution of optically-perceptible information over a video raster, said apparatus comprising combining means for receiving an input video signal and a delayed video signal and combining the input video signal and the delayed video signal to provide an output video signal, memory means for receiving and temporarily storing the output video signal, and read/write means for accessing the memory means so that during a given frame of the output video signal the output video signal is written to a range of memory locations starting at a first location, and on the next frame of the output video signal the delayed video signal is read from a range of memory locations starting at said first location and the output video signal is written to a range of memory locations starting at a second location, the second location being offset from the first location.

In accordance with a fifth aspect of the present invention there is provided an improved method of processing a video signal representing distribution of optically-perceptible information over a video raster by combining an input video signal and a delayed video signal to provide an output video signal, writing the output video signal into memory, and reading the contents of the memory, wherein the improvement resides in controlling the reading and writing so that during a given frame of the output video signal the output video signal is written to a range of memory locations starting at a first location, and on the next frame of the output video signal the contents of the memory are read from a range of memory locations starting said first location to provide the delayed video signal and the output video signal is written to a range of memory locations starting at a second location, the second location being offset from the first location.

The subject matter of the present invention is particularly pointed out and distinctly claimed in the concluding portion of this specification. However, both the organization and method of operation may best be understood by reference to the following detailed description and accompanying drawings.

BRIEF DESCRIPTION OF THE DRAWINGS

In the several figures of the drawings, like reference numerals designate components having similar functions.

DETAILED DESCRIPTION

Figure 2:
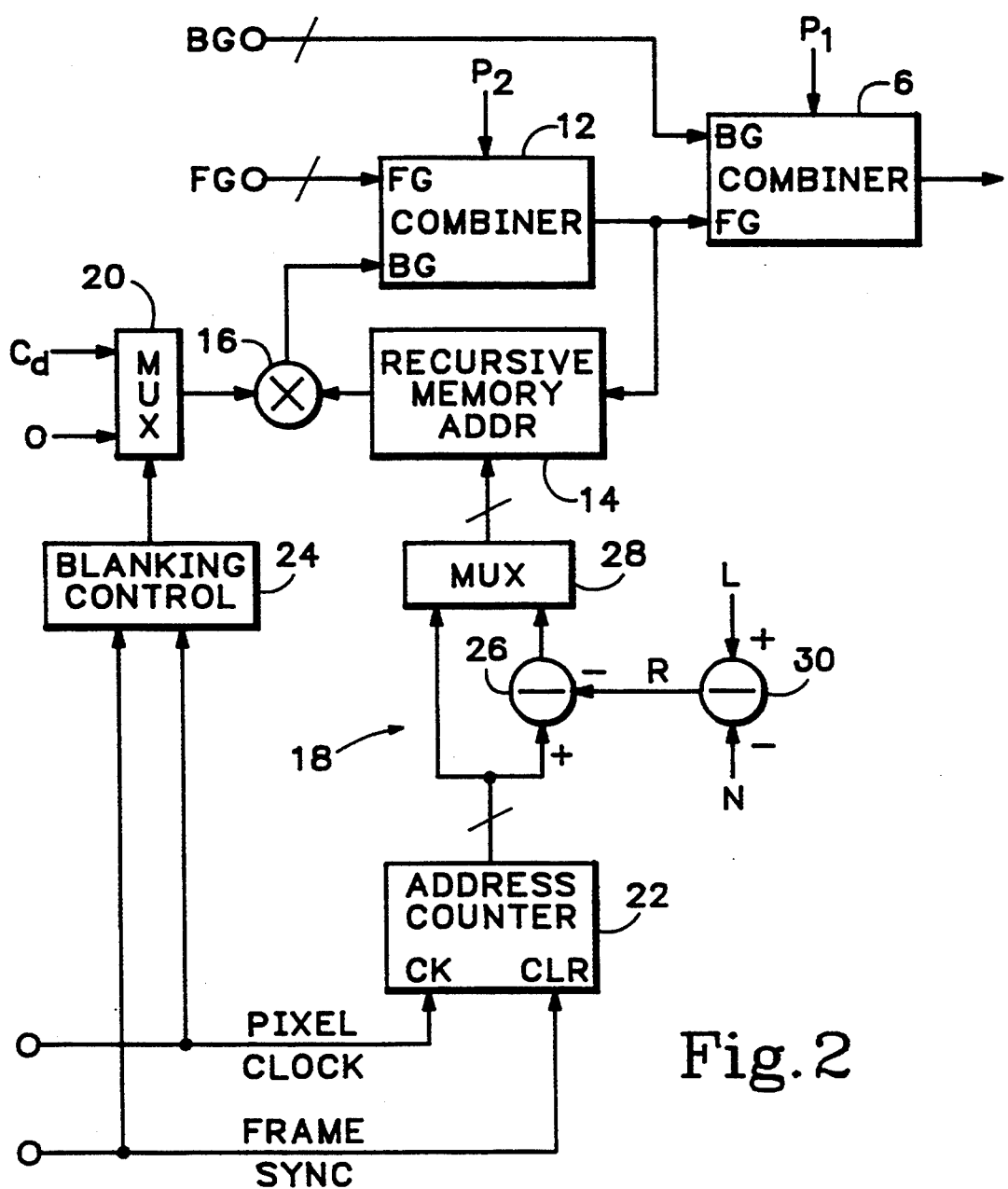
FIG. 2 is a block diagram of a first RAM-based circuit embodying the present invention.

Referring to FIG. 2, the address signals used for accessing the recursive memory 14 are generated by an address signal generator 18 including an address counter 22 that counts pixel clock pulses and is cleared by a frame sync pulse. The address counter 22 counts lines (vertical) and pixels (horizontal) separately and generates an address signal having a vertical component and a horizontal component defining the logical address (x,y) in the video raster of the pixel currently at the foreground input of the combiner 12. The address signal generator also includes two subtraction circuits 26 and 30. The subtraction circuit 30 receives the latency offset signal L and an auto-translation offset signal N at its addend and subtrahend inputs respectively and provides a resultant offset signal R to the subtrahend input of the subtraction circuit 26. Like the latency offset, the auto-translation offset N may be considered as a vector having a horizontal component $N_h$ representing a selected number of pixels along a line of the video raster and a vertical component $N_v$ representing a selected number of lines of the raster. Consequently, the resultant offset R defines a vector having a horizontal component $h=N_h-L_h$ and a vertical component $v=N_v-L_v$. The subtraction circuit 26 receives the address signal provided by the counter 22 at its addend input, and the output of the subtraction circuit 26 represents the position (x-h, y-v) in the video raster.

On the write portion of a read/write cycle, a multiplexer 28 selects the output of the subtraction circuit 26 as the address signal for the memory 14, and on the read portion of the cycle the multiplexer selects the output of the address counter 22. Therefore the output pixel $OUTPUT_{(x,y)}$ provided by combiner 12 is loaded into the memory 14 at location (x-h, y-v) and that the content of location (x,y), i.e., OUTPUT(x+h,y+v) is combined with the input pixel INPUT(x,y) to produce OUTPUT(x,y).

This operation may be represented by the equation $$OUTPUT_{(x,y)} = f(INPUT_{(x,y)}) + g(OUTPUT_{x+h,y+v}) \quad (1)$$

where f and g are functions containing the decay and combining process associated with the normal recursive video effect.

Figure 1:
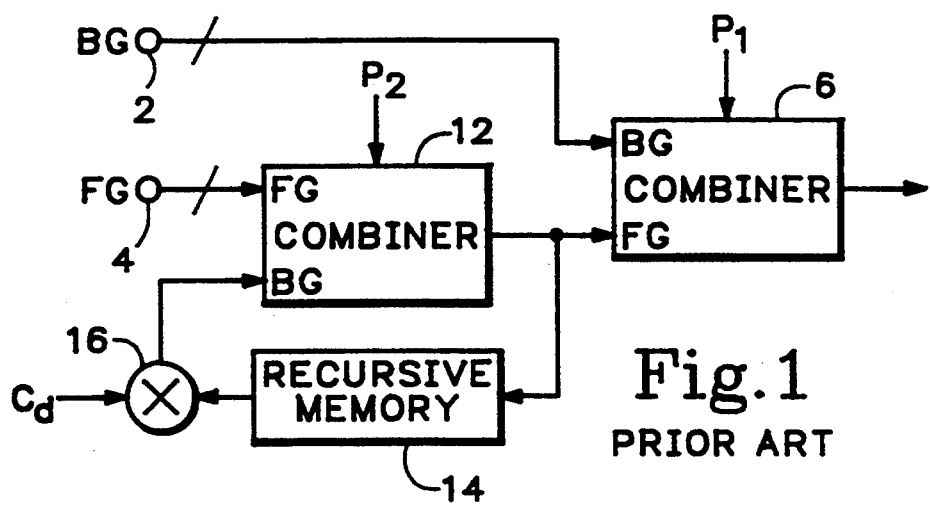
FIG. 1 is a block diagram of a recursive memory loop circuit for producing decaying after-images.

If the auto-translation offset N is equal to zero, the resultant offset R is equal to L and so on a given read/write cycle the write address lags the read address by the latency offset L and the apparatus shown in FIG. 2 then functions in essentially the same way as the apparatus shown in FIG. 1. However, when the auto-translation offset N is not equal to zero and a frame of video provided by the combiner 12 is written into and subsequently read from the recursive memory 14, the frame that is read from the memory is delayed relative to the output frame provided by combiner 12 and is shifted relative to the output frame by the auto-translation offset N. The output signal of combiner 12 represents the foreground object with a decaying trail extending in the direction of the vector formed by the auto-translation offset N. This trail is provided regardless of whether the foreground object is moving relative to the raster, and therefore even a stationary object is given a "wind blown" appearance.

The multiplication factor that is applied to the multiplier 16 for operating on the output of the recursive memory 14 is provided by a multiplexer 20, which selects either the decay factor $C_d$ or zero in dependence on the output of a blanking control circuit 24. The blanking control circuit 24 receives the pixel clock pulses and the frame sync pulses and provides a logical zero output during the horizontal and vertical blanking intervals and provides a logical one output otherwise. The multiplexer 20 selects the decay factor $C_d$ during the active video portion of active lines of the video frame, and otherwise selects the constant zero. This avoids wraparound of the trail from one edge of the video raster to the opposite edge.

For a positive value of R, i.e., v is positive or v is zero and h is positive, the pixel value $OUTPUT_{x,y,q}$ that is written into the memory location (x-h, y-v) on frame q is read from the memory during frame q+1. As a result, when the object represented by the foreground video signal moves relative to the video raster, the movement of the trail that occurs in response to movement of the object takes place with a slight delay relative to movement of the object, so that the trail appears to exhibit viscosity.

A negative value of R, i.e., a value of R such that v is negative or v is zero and h is negative, results in information derived from a pixel location that is addressed early in the video frame being written to a location that is addressed later in the same frame.

Consider the case where y=20, h=0 and v=-1; for simplicity assume that the latency L=0:

$$OUTPUT_{(x,20)} = f(INPUT_{(x,20)}) + g(OUTPUT_{(x,19)}) \quad (1.1)$$

and on the next line, $$OUTPUT_{(x,21)} = f(INPUT_{(x,21)}) + g(OUTPUT_{(x,20)}) \quad (1.2)$$

From equations (1.1) and (1.2) and further extrapolation line 21 depends on line 20, which depends on line 19, which depends on line 18, and so on, back to the first line. The result of this intra-frame recursion is that if the foreground object moves in the raster, the trail moves without any perceptible delay or viscosity, so that the object and the trail emanating from it appear as a single unit.

Intra-frame recursion occurs when the physical memory location that is addressed for writing on a given read/write cycle is ahead of the address that is accessed for reading during that cycle. Therefore, intra-frame recursion can only occur if the resultant offset R is negative, which implies that the auto-translation offset N is greater than the latency offset L.

The effect provided by negative values of R is believed to be less visually interesting than that provided by positive values of R, and in some cases the difference in quality of the effect might be such as to render it desirable to permit selection only of positive values of R. However, this limits the range of available directions of the auto-translation offset vector, which limits the range of possible directions of the trail relative to the object.

Intra-frame recursion can be avoided by increasing the latency of the recursive processing. In accordance with the invention described in U.S. Pat. No. 4,951,144 to the present inventor for "Recursive Video Blur Effect", a two dimensional blurring filter could add several lines of latency. Additional latency could be achieved by adding delay such as shift registers or small memories unassociated with filtering. Such latency increases the amount of downward auto-translation while avoiding intra-frame recursion.

Figure 3:
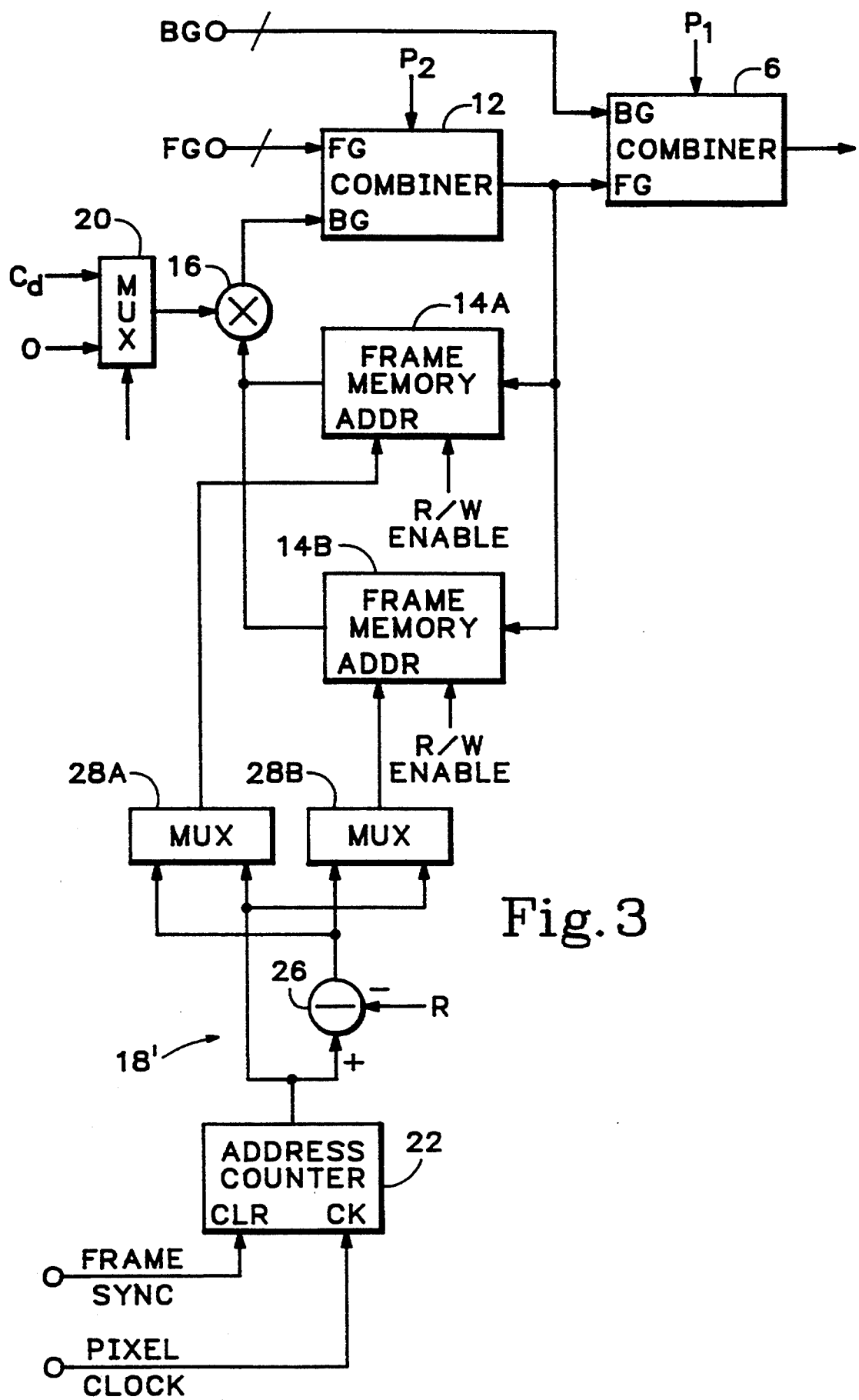
FIG. 3 is a block diagram of a second RAM-based circuit embodying the present invention.

Intra-frame recursion can be avoided without limiting the direction of the auto-translation offset vector by using dual recursive memories 14A and 14B and an address signal generator 18' that includes dual multiplexers 28A and 28B, as shown in FIG. 3. During odd-numbered frames in a sequence, the memory 14A receives a write enable signal and receives the output of subtraction circuit 26 as its write address signal, while the memory 14B receives a read enable signal and receives the output of address counter 22 as its read address signal, whereas on even-numbered frames the read and write enable signals and the read and write address signals are reversed.

The circuit shown in FIG. 3 has the advantage of avoiding intra-frame recursion without limiting the auto-translation offset N, but is subject to disadvantage because of the cost involved in providing dual frame memories.

Figures 4, 8:
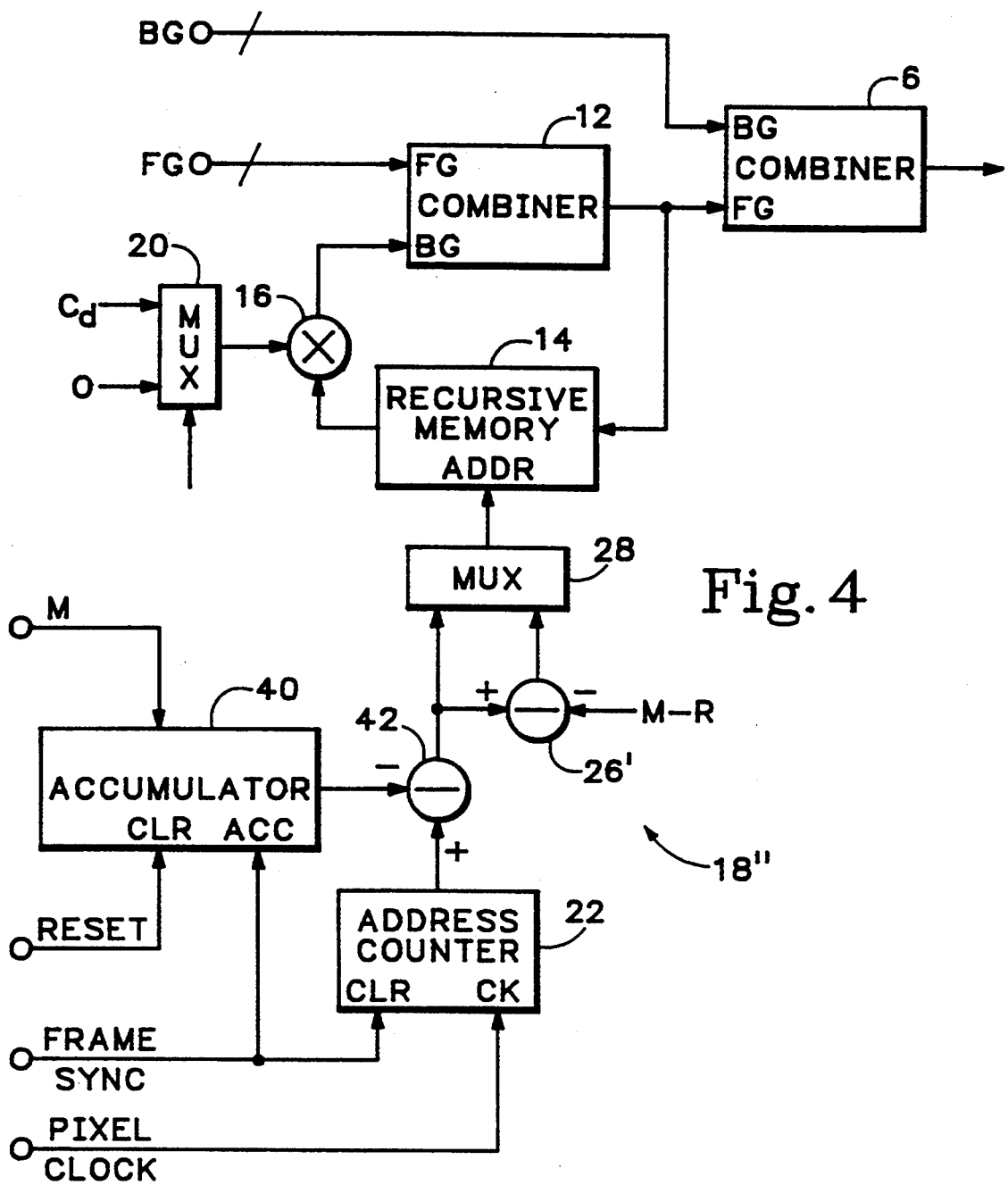
FIG. 4 is a block diagram of a third RAM-based circuit embodying the present invention.
FIG. 8 is a schematic representation of part of the video frame.

The circuit shown in FIG. 4 avoids intra-frame recursion without limiting the direction of the auto-translation offset vector. As shown in FIG. 4, the address signal generator 18″ includes an accumulator 40 having a reset input and an input value M by which it increments upon the occurrence of the frame sync pulse. Subtraction circuit 42 subtracts the output of the accumulator 40 from the output of the address counter 22 to provide the read address signal that is applied to the multiplexer 28. Subtraction circuit 26′ subtracts an offset $M-R$, where $R<M$, from the output of subtraction circuit 42 to provide the write address signal that is applied to the multiplexer 28. To illustrate how the FIG. 4 circuit operates, a preliminary example is discussed in which the resultant offset R is equal to the latency offset L, i.e. $N=0$. Prior to invoking the recursive effect, a reset signal clears the accumulator 40 on occurrence of the next frame sync pulse, so the result is a zero value on the output of the accumulator during the first frame. During the first frame of video data, the first subtraction circuit 42 subtracts this zero from the output of the address counter 22 to provide the read address. The subtraction circuit 26′ subtracts the quantity $M-R$ from the read address to produce the write address. Since $R=L$ in this example, the write address is the read address minus $(M-L)$. Thus, the physical addresses being written to are displaced by $(M-L)$ toward the beginning of the frame from the physical addresses being read from.

Following this same example further, at the beginning of the second frame of video data, the frame sync pulse occurs in the absence of a reset signal, loading M in the accumulator 40. During this frame the read address produced on the output of the subtraction circuit 42 is the output of the address counter 22 minus M. Therefore, the video signal that is read from the memory 14 during the second frame is displaced by the latency offset L from the video signal written into the memory during the first frame and there is no shift in the logical image relative to the raster. Also, the write address produced on the output of the subtraction circuit 26′ is the output of the address counter 22 minus $(2M-L)$. Thus, again the memory locations being written to are displaced by $(M-L)$ from the memory locations being read from.

At the beginning of the third frame, another frame sync pulse increments the contents of the accumulator 20 by M. (In general, the output of the accumulator 40 constitutes an element of an arithmetic progression defined by an initial value of zero and a common difference of M.) During the third frame the output of the subtraction circuit 42 is the output of the address counter 22 minus 2M and the output of the subtraction circuit 26′ is the output of the address counter minus $(3M-L)$. Once again, the memory locations being written to are displaced by $(M-L)$ from the memory locations being read from and the video signal that is read from the memory is displaced by the latency offset L from the video signal that was written into the memory during the preceding frame so that there is no shift in the logical image.

If then the operator selects a desired value N for the auto-translation offset such that the maximum quantity of the resultant offset R is smaller than M, the value $M-R$ received at the subtrahend input of the subtraction circuit 26′ is always positive, and the output of the subtraction circuit 26′ is always less than the output of the subtraction circuit 42. Therefore, the physical write address always trails the physical read address and the pixel $OUTPUT_{x,y}$ that is written into the memory 14 during the current frame is not read from the memory until the next frame. In this manner, intra-frame recursion is avoided without resort to dual memories.

The principle of operation underlying the circuit shown in FIG. 4 is to limit the magnitude of the auto-translation offset vector and apply a frame-by-frame stepwise increasing negative base offset to the physical write address, this step increment in the negative base offset being greater than the magnitude of the resultant offset vector. The stepwise increasing negative base offset ensures that the physical write address can never exceed the physical read address, and consequently during a given frame the output of the combiner 12 cannot be written to a location that will be addressed for reading subsequently in the same frame.

The range of the address counter 22 is equal to the address range of the memory 14, and the outputs of the subtractors 42 and 26′ wrap around from the end of the address range of the memory back to the beginning. Consequently, the memory 14 functions as an endless circular memory and so the reset input to the accumulator 40 is optional, because it is the change in the output of the accumulator from one frame to the next that is important, rather than the absolute value of the output of the accumulator.

Figure 5:
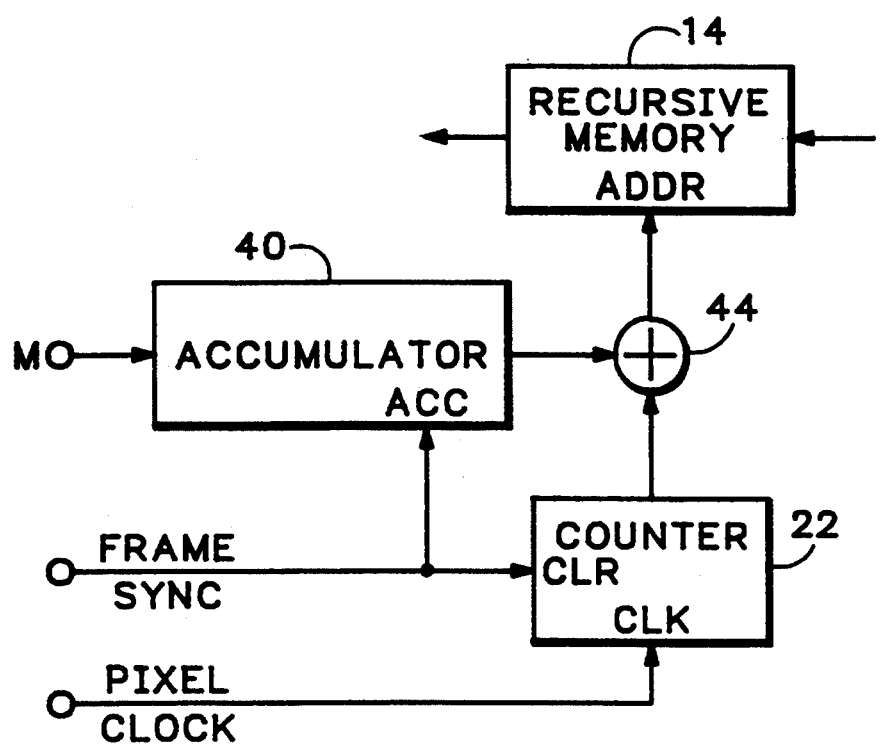
FIG. 5 is a block diagram of a first modification of FIG. 4.

FIG. 5 illustrates a modification of the circuit shown in FIG. 4. As shown in FIG. 5, the output of the accumulator is applied to one input of an adder 44 that receives the output of the address counter 22 at its other input and has its output connected to supply both the read address signal and the write address signal to the recursive memory 14.

On a given read/write address cycle, the pixel value having the physical address A is read from the memory 14 and the pixel value at the input of the memory 14 is written to the same physical address. The pixel value read from the physical address A has the logical address P, but because of processing latency the logical address of the pixel value written into the memory on that read/write cycle is offset from the logical address P by the latency L. Therefore, as a result of reading and writing an entire frame, the logical image is shifted downward in the memory by the latency offset. If the input M to the accumulator were equal to L, on the next frame the pixel value that was read from the physical address $A+L$ would have the same logical address as the pixel value that was read from the physical address A on the previous frame, and accordingly the logical image would not be shifted relative to the raster. If M were greater than L, during the next frame the pixel would be read earlier than if M were equal to L and there would be a trail emanating upwards from the object. If M were less than L, the pixel would be read later than if M were equal to L and there would be a trail emanating downward from the object.

Figure 6:
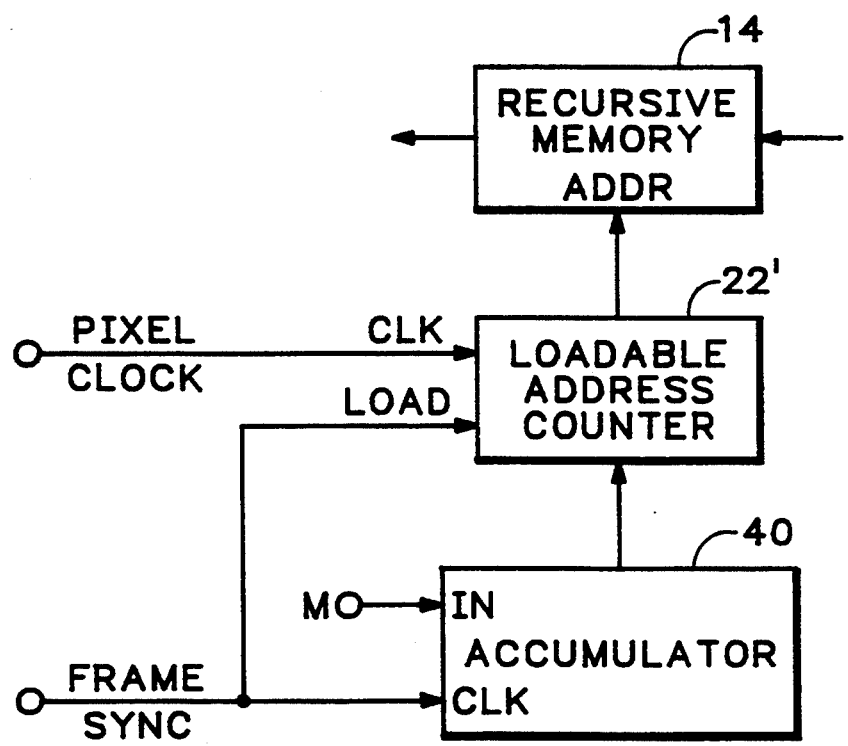
FIG. 6 is a block diagram of a second modification of FIG. 4.

FIG. 6 illustrates a further modification of the circuit shown in FIG. 4. In the case of FIG. 6, a loadable address counter 22' is loaded with the output of the accumulator 40 in response to a frame sync pulse. The addition therefore takes place in the counter 22' instead of in the separate adder 44 shown in FIG. 5.

The foregoing description has treated the various offsets as having distinct vertical and horizontal components, which requires that the address counter and other components of the address generator operate separately for lines (vertical) and pixels (horizontal). This is convenient for explanation of the offset, particularly when the recursive memory is a random access memory that is considered as storing the video signal in line by line fashion. However, it is instead possible to count only pixels for the entire frame, in which case the latency offset L is the sum of the number of pixels per line (p) times the number of lines of vertical offset ($L_v$), plus the number of pixels of horizontal offset ($L_h$) and similarly the auto-translation offset N is the sum of the number of pixels per line (p) times the number of lines of vertical offset ($N_v$), plus the number of pixels of horizontal offset ($N_h$), and so the resultant offset R is given by:

$$R = p*L_v + L_h - p*N_v - N_h$$

Treating R as a single number is convenient when the key and video data are processed as a linear stream, for example by storing in a FIFO (first-in, first-out) memory. The conceptual model of a FIFO memory is a sequential array of memory locations although it may be implemented with a random access memory.

Figure 7:
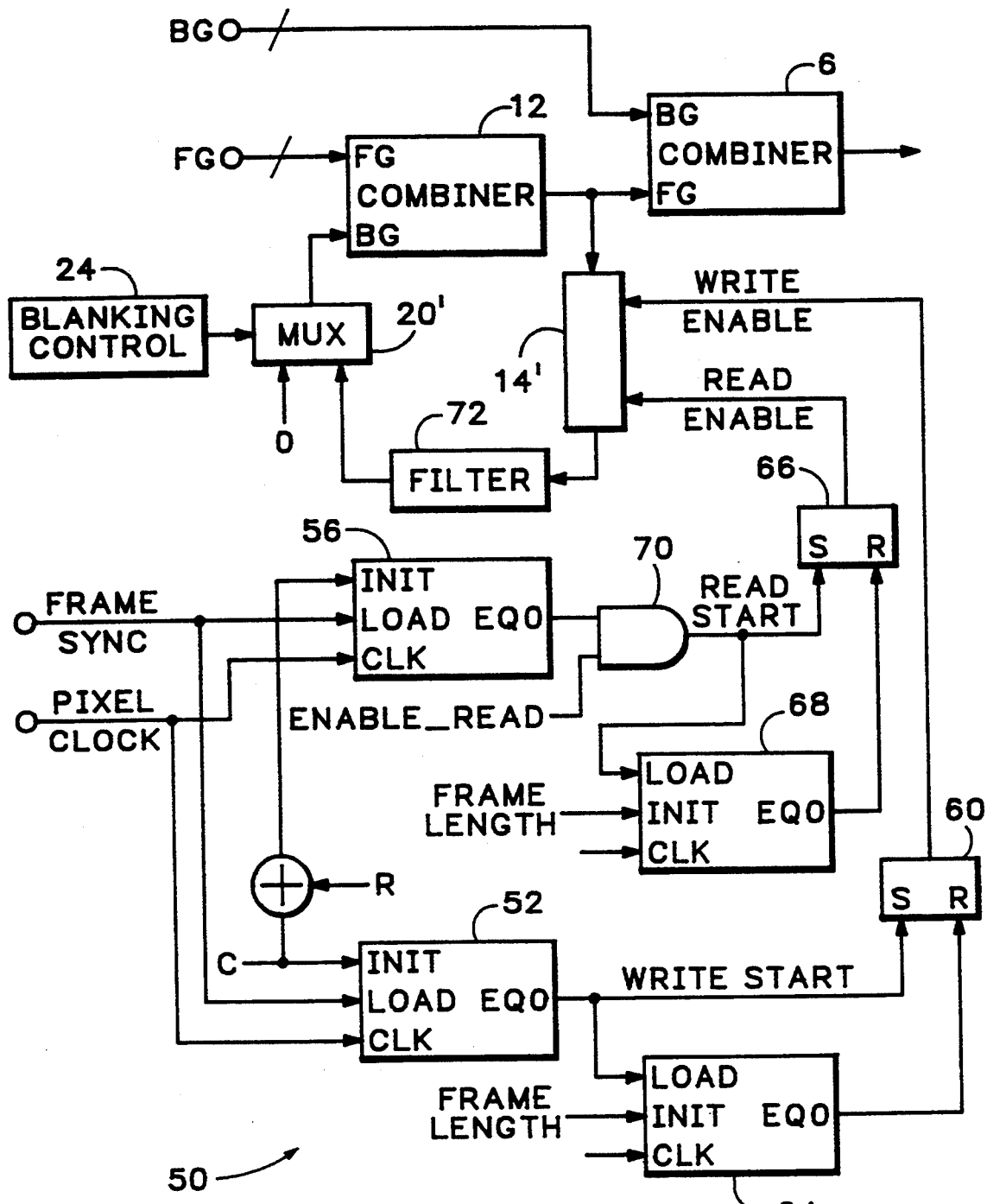
FIG. 7 is a block diagram of a FIFO-based circuit for producing recursive video auto-translation according to the present invention.

FIG. 7 illustrates how the image represented by the second input of the combiner 12 relative to the image represented by the output of the combiner may be offset by use of a FIFO memory 14' instead of the random access memories described with reference to FIGS. 2–4. The total number of memory locations in the FIFO memory 14' is at least twice the number of pixels in a frame. Of the current digital formats for broadcast video signals, digital PAL has the greatest number of pixels per frame (1,135 pixels per line and 625 lines per frame for a total of about 710,000 pixels per frame), and accordingly the FIFO memory is designed to have at least 1,420,000 memory locations in order to allow use of the apparatus with all the standard broadcast video formats. The memory 14' has a write enable input and a read enable input. When the write enable input is active, key and video data received from the combiner 12 is written into the memory and when the read enable input is active, key and video data is read from the memory on a first-in, first-out basis.

The apparatus shown in FIG. 7 also includes read/write control circuitry 50 for controlling the read and write enable inputs. The read/write control circuitry 50 includes two down-counters 52, 56. Prior to the beginning of the active interval of each frame, the frame sync pulse loads a constant C into the down-counter 52, which counts down on the occurrence of pixel clock pulses. The constant C is equal to the number of pixel clock pulses that occur between the frame sync pulse and about line 10 of the video frame. In accordance with current broadcast video standards, the vertical blanking interval lasts until about line 20 of the frame and therefore the down-counter 52 asserts its EQUAL-TO-ZERO output near the middle of the vertical blanking interval, for example about ten lines before the start of active video. The EQUAL-TO-ZERO output of the down-counter 52 is connected to the SET input of a set-reset flip-flop 60 and to the LOAD control input of a down-counter 64, which loads the value FRAMELENGTH when LOAD is active and otherwise counts down on pixel clock pulses. FRAMELENGTH is equal to the number of pixel clock pulses between about line 10 of the video frame and a selected line after the end of active video but before the next frame sync pulse. When down-counter 64 reaches zero it momentarily raises its EQUAL-TO-ZERO output. The EQUAL-TO-ZERO output of down-counter 64 is connected to the RESET input of set-reset flip-flop 60, so that when counter 64 reaches zero it resets flip-flop 60. The output of flip-flop 60 is connected to the write enable input of the FIFO memory 14'. Consequently, the write enable input of the FIFO memory 14' is active from when the EQUAL-TO-ZERO output of the down-counter 52 is asserted until the EQUAL-TO-ZERO output of down-counter 64 is asserted, and is inactive otherwise. Therefore, when a recursive effect is invoked the memory 14' loads key and video data from about ten lines before the start of active video of each frame until after the end of active video.

The down-counter 56 is loaded with the number (C+R) prior to the beginning of each frame and counts down on pixel clock pulses. When down-counter 56 reaches zero, it momentarily raises its EQUAL-TO-ZERO output. This occurs R clock pulses after down-counter 52 asserts its EQUAL-TO-ZERO output. (If R is negative, down-counter 56 reaches zero before down-counter 52.) The EQUAL-TO-ZERO output of down-counter 56 is connected to one input of an AND gate 70, which receives an ENABLE_READ signal at its second input. When a recursive effect is invoked, the ENABLE_READ signal is held at logical zero until the first frame of the output signal of the combiner 12 has been loaded into the memory 14' and then goes to logical one. The ENABLE_READ signal therefore disables AND gate 70 until the FIFO memory 14' has been loaded with one frame of key and video data. On the next frame sync pulse, the number (C+R) is again loaded into down-counter 56, which counts down on clock pulses. When down-counter 56 reaches zero for the second time, ENABLE_READ is at logical one and therefore the AND gate 70 is satisfied when the EQUAL-TO-ZERO output of down-counter 56 goes high.

The output of AND gate 70 is connected to the SET input of a set-reset flip-flop 66 and to the LOAD control input of a down-counter 68. The down-counter 68 loads the value FRAMELENGTH when LOAD is active, and otherwise down-counter 68 counts down on pixel clock pulses. When down-counter 68 reaches zero it momentarily raises its EQUAL-TO-ZERO output. The EQUAL-TO-ZERO output of down-counter 68 is connected to the RESET input of set-reset flip-flop 66, so that when counter 68 reaches zero it resets flip-flop 66. The output of flip-flop 66 is connected to the read enable input of FIFO memory 14'. Consequently, after ENABLE_READ goes to logical one the read enable input of the FIFO memory 14' is active from when the EQUAL-TO-ZERO output of the down-counter 56 is asserted until the EQUAL-TO-ZERO output of the down-counter 66 is asserted, and is inactive otherwise. On each frame, the read enable signal is active for a time equal to FRAMELENGTH, and is offset in time relative to the write enable signal by the value R, which can be positive or negative. The memory 14' therefore acts as a variable delay, delaying the output signal of the combiner 12 by one frame plus R clock pulses for positive R or two frames plus R clock pulses for negative R, and this has the effect of shifting the key and video data relative to the video raster, as explained with reference to FIG. 2. Since the data that is read from the memory on a given read/write cycle is from an earlier frame than the one that is currently being provided at the output of the combiner 12, intra-frame recursion is avoided.

The read/write control circuitry 50 ensures that there is an interval during which key and video data is not loaded into the memory 14' and that the number of pixels read and the number of pixels written are the same. Therefore, the apparatus shown in FIG. 7 is always in a stable and predictable state at the start of loading of the memory 14'.

The amount of the delay that can be imposed by the FIFO memory 14' is constrained within predetermined limits. If the write start pulse is at the midpoint of a 20 line vertical blanking interval, N can have a value that corresponds to a delay from minus ten lines to plus ten lines. If N is zero, then the video signal provided by the FIFO memory is in phase with the input video signal, and provided that the input video signal represents a stationary object, the output video signal of the memory 14' represents an object that is in the same position as that represented by the input signal. Values of N corresponding to the range from (but not including) zero to plus ten lines result in the object represented by the video signal at the output of the FIFO memory being translated downwards relative to the raster of the incoming video so that a stationary object has a decaying trail that extends downwards from the object, whereas values of N corresponding to the range from minus ten lines to (but not including) zero result in the object being translated upwards so that a stationary object has a trail that extends upwards. If N is not equal to an integral multiple of the number of pixels on one line, the object is translated to the left or right as well as up or down.

In the case of FIG. 7, a low-pass filter 72 is connected in the recursive loop between the output of the memory 14' and the background input of the combiner 12. The low-pass filter 72 may be used to accomplish recursive blurring, as described in U.S. Pat. No. 4,951,144 to the present inventor for "Recursive Video Blur Effect". Recursive blurring causes the features of a video image to blur as well as fade with the passage of time and additional trips through the recursive loop, and when combined with the auto-translation effect described above, the resulting wind-blown effect becomes much more smooth and pleasing. Attenuation by the decay factor $C_d$ is also effected in the filter 72.

FIG. 7 also illustrates an alternative method for avoiding wraparound of the trail emanating from the object represented by the foreground signal. During the vertical and horizontal blanking intervals of the foreground video, the multiplexer 20', operating under control of the blanking control circuit 24, selects the constant zero for the background input of the combiner 12.

FIG. 8 illustrates schematically a portion of the array of pixel locations defined by the output signal of the combiner 12 shown in FIG. 7. If the frame sync and pixel clock signals currently define the pixel 80 shown in FIG. 8, having the coordinates (x,y), and the auto-translation offset N has a horizontal component $N_h$ of plus three and a vertical component $N_v$ of plus three, ignoring the latency offset L the corresponding pixel value that is read from the memory 14' is that for the pixel 82 having the coordinates (x+3,y+3). So long as the value of the auto-translation offset remains the same, the trail from the current location of the object extends in the direction from the pixel 80 to the pixel 82. If the value of $N_h$ or $N_v$ is altered, the direction and/or length of the trail changes. However, if the value of the horizontal component of the auto-translation offset were changed from three to two, the result would be a perceptible jerkiness of the change in direction of the trail. The jerkiness in the change of direction could be reduced by changing both the value of the vertical offset component and the value of the horizontal offset component, for example by increasing h to plus four and v to plus five, so that the pixel value that would be read would be that for the pixel 84 (x+4,y+5), but then the length of the auto-translation offset, and consequently the length of the trail, would change. In order to avoid this problem, the filter 72 shown in FIG. 7 may include a bi-linear interpolator that provides pixel values for sub-integer values of the horizontal and vertical components of the auto-translation offset. Such an interpolator is effected by adjusting the filter coefficients in the filter 72, for example on a frame-by-frame basis, and allows the auto-translation offset vector to change its magnitude and/or direction in a manner without perceptible jerkiness.

The invention is not restricted to the particular embodiments that have been described, and variations may be made therein without departing from the scope of the invention as defined in the appended claims and equivalents thereof. For example, the invention is not restricted to use of a priority combiner as shown in U.S. Pat. No. 4,851,912 to effect combination of the input video with the attenuated output of the recursive memory or to effect combination of the output of the recursive effect circuit with the background video, and in each case a less sophisticated or more sophisticated form of video mixer could be employed.

Also, the invention is not restricted to the multiplier 16 being at the output of the recursive memory, and it may instead be at the input. If recursive blurring is employed, the multiplier 16 may be implemented by adjusting the coefficients of the low-pass filter. Further, since use of a base offset to prevent writing ahead has general application to recursive video effects and is not restricted to the case in which an auto-translation offset is imposed, the invention is not restricted to the case in which an auto-translation offset is applied. This may be accomplished by setting N in FIG. 4 equal to zero.

I claim:

1. Apparatus for processing a video signal representing distribution of optically-perceptible information over a video raster, said apparatus comprising:

combining means for receiving the video signal and a delayed video signal and combining the video signal and the delayed video signal to provide an output video signal, memory means for receiving and temporarily storing the output video signal and providing the delayed video signal, and means for translating the delayed video signal relative to the output video signal so that, when the delayed video signal and the video signal are combined by the combining means, a stationary object in the output video signal, when displayed on the video raster displays a trail effect.

2. Apparatus according to claim 1, wherein the memory means comprise a random access memory and the read/write control means have a read address output and a write address output, the write address output providing an address signal that is offset from the address signal provided by the read address output.

3. Apparatus according to claim 2, wherein the translating means comprise an address counter for counting pixel clock pulses, a first subtraction circuit having an addend input connected to receive the output of the address counter and also having a subtrahend input, means connected to the subtrahend input of the first subtraction circuit for applying thereto a number that is an element of an arithmetic series having a predetermined common difference, a second subtraction circuit having an addend input connected to the output of the first subtraction circuit and also having a subtrahend input, and means for applying a number no greater than said predetermined common difference to the subtrahend input of the second subtraction circuit.

4. Apparatus according to claim 1, wherein the memory means comprise a first-in, first-out memory and the read/write control means comprise means for selectively controlling the difference between the time at which the memory starts writing a video frame and the time at which the memory starts reading a video frame.

5. Apparatus according to claim 1, comprising a loop multiplier for multiplying the delayed video signal by a selected constant.

6. Apparatus according to claim 1, comprising filter means for carrying out a preselected filtering operation on the delayed video signal.

7. A method of processing a video signal representing distribution of optically-perceptible information over a video raster, said method comprising the steps of:
combining the video signal and a delayed video signal to provide an output video signal,
receiving and temporarily storing the output video signal to provide the delayed video signal, and
translating the delayed video signal relative to the output video signal on the video raster so that, when the delayed video signal is combined with the video signal, a stationary object on the video raster displays a trail effect.

8. Apparatus for processing a video signal representing distribution of optically-perceptible information over a video raster, said apparatus comprising:
combiner means for receiving the video signal and a delayed video signal and combining the video signal and the delayed video signal to provide an output video signal,
memory means for storing the output video signal and for providing the delayed video signal, and
means for translating the delayed video signal relative to the output video signal on the video raster so that when the delayed video signal and the video signal are combined, a stationary object in the output video signal displays a trail effect on the video raster.

9. Apparatus according to claim 8, wherein the memory means comprise a random access memory and the read/write control means have a read address output for providing a read address signal and a write address output for providing a write address signal, the write address signal being offset from the read address signal.

10. Apparatus according to claim 9, wherein the translating means comprise an address counter for counting pixel clock pulses, a first subtraction circuit having an addend input connected to receive the output of the address counter and also having a subtrahend input, means connected to the subtrahend input of the first subtraction circuit for applying thereto a number that is an element of an arithmetic series having a predetermined common difference, a second subtraction circuit having an addend input connected to the output of the first subtraction circuit and also having a subtrahend input, and means for applying a number no greater than the common difference of the arithmetic series to the subtrahend input of the second subtraction circuit.

11. Apparatus according to claim 8, wherein the memory means comprise a first-in, first-out memory and the read/write control means comprise means for selectively controlling the difference between the time at which the memory starts writing a video frame and the time at which the memory starts reading a video frame.

12. Apparatus for processing a video signal representing distribution of optically-perceptible information over a video raster, said apparatus comprising:
combining means for receiving the video signal and a delayed video signal and combining the video signal and the delayed video signal to provide an output video signal,
memory means for receiving and temporarily storing the output video signal, and
read/write means for accessing the memory means so that during a given frame of the output video signal the output video signal is written/not a range of memory locations starting at a first location, and on the next frame of the output video signal the delayed video signal is read from a range of memory locations starting at said first location and the output video signal is written to a range of memory locations starting at a second location, the second location being offset from the first location,
whereby a stationary object in the output video signal displays a trail effect on the video raster.

13. Apparatus according to claim 12, wherein the read/write control means access the memory means so that during a third frame of the output video signal the delayed video signal is read from a range of memory locations starting at said second location and the output video signal is written to a range of memory locations starting at a third location, the third location being offset from the second location by the same amount as the second location is offset from the first location.

14. Apparatus according to claim 12, wherein the read/write means comprise an address counter for counting pixel clock pulses, a first subtraction circuit having an addend input connected to receive the output of the address counter and also having a subtrahend input, means connected to the subtrahend input of the first subtraction circuit for applying thereto a number that is an element of an arithmetic series having a predetermined common difference, a second subtraction circuit having an addend input connected to the output of the first subtraction circuit and also having a subtrahend input, and means for applying the common difference of the arithmetic series to the subtrahend input of the second subtraction circuit.

15. An improved method of processing a video signal representing distribution of optically-perceptible information over a video raster by combining the video signal and a delayed video signal to provide an output video signal, writing the output video signal into memory, and reading the contents of the memory, wherein the improvement resides in:

controlling the reading and writing so that during a given frame of the output video signal the output video signal is written to a range of memory locations starting at a first location, and on the next frame of the output video signal the contents of the memory are read from a range of memory locations starting at said first location to provide the delayed video signal and the output video signal is written into a range of memory locations starting at a second location, the second location being offset from the first location, whereby a stationary object in the output video signal displays a trail effect on the video raster.

16. A method according to claim 15, comprising controlling the reading and writing so that during a third frame of the output video signal the contents of the memory are read from a range of memory locations starting at said second location to provide the delayed video signal and the output video signal is written into a range of memory locations starting at a third location, the third location being offset from the second location by the same amount as the second location is offset from the first location.

17. Apparatus according to claim 2 wherein the translating control means comprises:

means for counting pixel clock pulses to produce the read address output;

means for generating the write address output that is the read address output offset by a spatial offset value;

means for applying the read address output to the memory means to provide the delayed video signal and for applying the write address output to the memory means to temporarily store the output video signal in the memory means.

18. Apparatus according to claim 17 wherein the generating means comprises:

a first subtractor having the read address output as an addend input and having the spatial offset value as a subtrahend input to produce the write address output; and a second subtractor having a latency offset value as an addend input and having a translation offset value as a subtrahend input to produce the spatial offset value.

19. Apparatus according to claim 18 wherein the random access memory comprises:

a first frame memory coupled to receive for storage the output video signal during odd numbered frames of the input video signal and provide the delayed video signal during even numbered frames of the input video signal; and a second frame memory coupled to receive for storage the output video signal during even numbered flames of the input video signal and provide the delayed video signal during odd numbered frames of the input video signal.

* * * * *